(12) United States Patent
Baernthaler et al.

(10) Patent No.: US 9,511,431 B2
(45) Date of Patent: Dec. 6, 2016

(54) INSERT AND SAW BLADE WITH A PLURALITY OF INSERTS OF THIS TYPE

(75) Inventors: Walter Baernthaler, St. Marein im Muerztal (AT); Martin Lukas, Kindberg (AT); Andre Feiel, Tragoess (AT); Bernhard Theischinger, Gundskirchen (AT); Josef Zierler, Ebensee (AT)

(73) Assignee: BOEHLERIT GmbH & Co.KG., Kapfenberg (AT)

( * ) Notice: Subject to any disclaimer, the term of this patent is extended or adjusted under 35 U.S.C. 154(b) by 903 days.

(21) Appl. No.: 13/155,984

(22) Filed: Jun. 8, 2011

(65) Prior Publication Data

US 2011/0303070 A1 Dec. 15, 2011

(30) Foreign Application Priority Data

Jun. 9, 2010 (AT) .................................. A 942/2010

(51) Int. Cl.
| | |
|---|---|
| B27B 13/02 | (2006.01) |
| B26D 1/12 | (2006.01) |
| B23D 63/00 | (2006.01) |
| B23D 61/06 | (2006.01) |
| B23B 27/04 | (2006.01) |
| B23B 27/16 | (2006.01) |

(52) U.S. Cl.
CPC ............ *B23D 61/06* (2013.01); *B23B 27/045* (2013.01); *B23B 27/1625* (2013.01); *B23B 2205/02* (2013.01); *Y10T 83/9319* (2015.04)

(58) Field of Classification Search
CPC .................. B23B 2260/02; B23B 2200/088; B23B 27/04; B23B 2205/02; B23B 27/1625; B23B 27/045; B23D 61/06; Y10T 83/9319

USPC .............................. 83/835–855, 663; 76/112
See application file for complete search history.

(56) References Cited

U.S. PATENT DOCUMENTS

| | | | | |
|---|---|---|---|---|
| 3,885,488 A | * | 5/1975 | Evancic et al. .................. | 83/835 |
| 4,532,830 A | * | 8/1985 | Vollmer et al. ................... | 76/45 |
| 4,558,974 A | * | 12/1985 | Pano ............................... | 407/50 |
| 4,583,887 A | * | 4/1986 | Wertheimer .................. | 407/116 |

(Continued)

FOREIGN PATENT DOCUMENTS

| | | |
|---|---|---|
| CN | 1104138 | 6/1995 |
| CN | 101310904 | 11/2008 |

(Continued)

OTHER PUBLICATIONS

Austrian Office Action (and partial machine translation) dated Apr. 6, 2011 conducted in counterpart Austrian Application.

(Continued)

*Primary Examiner* — Ghassem Alie
*Assistant Examiner* — Bharat C Patel
(74) *Attorney, Agent, or Firm* — Greenblum & Bernstein, P.L.C.

(57) ABSTRACT

Insert and a saw blade including the insert. The insert is formed in an elongated manner and includes a cutting edge on a front side, a cutting face with an elevation formed along a length of the insert from the cutting edge, and a mounting surface structured and arranged for a clamping element one of directly or indirectly adjoining the cutting face. The mounting surface is formed with a first partial surface and at least one of an upwardly projecting second partial surface that adjoins the first partial surface and tapering lateral surfaces that are arranged at a side of the first partial surface and along a length of the insert starting from the cutting edge.

21 Claims, 4 Drawing Sheets

(56) References Cited

U.S. PATENT DOCUMENTS

| | | | |
|---|---|---|---|
| 4,643,620 A * | 2/1987 | Fujii et al. | 407/119 |
| 4,789,650 A * | 12/1988 | Friederich et al. | 501/87 |
| 4,801,224 A * | 1/1989 | Pettersson et al. | 407/110 |
| 5,035,545 A | 7/1991 | Zinner | |
| 5,059,068 A * | 10/1991 | Scott | 407/9 |
| 5,085,541 A * | 2/1992 | Simpson, III | 407/110 |
| 5,360,298 A * | 11/1994 | Hedlund | 407/110 |
| 5,411,354 A * | 5/1995 | Gustafsson | 407/110 |
| 5,516,241 A * | 5/1996 | Plutschuck et al. | 407/110 |
| 5,761,981 A * | 6/1998 | Stoffels | 83/840 |
| 5,795,109 A * | 8/1998 | Jonsson et al. | 407/72 |
| 5,827,017 A * | 10/1998 | Tagstrom et al. | 407/116 |
| 5,836,723 A | 11/1998 | Von Haas et al. | |
| 6,234,727 B1 * | 5/2001 | Barazani | 407/117 |
| 6,299,389 B1 * | 10/2001 | Barazani | 407/110 |
| RE37,595 E * | 3/2002 | Lindstedt | 407/116 |
| 7,331,096 B2 * | 2/2008 | Kugler et al. | 29/426.5 |
| 7,524,147 B2 * | 4/2009 | Hecht | 407/107 |
| 7,832,320 B2 * | 11/2010 | Earle et al. | 83/839 |
| 7,883,300 B1 * | 2/2011 | Simpson, III | B23B 27/045 407/113 |
| 7,887,267 B2 * | 2/2011 | Niemi et al. | 407/114 |
| 8,104,999 B2 * | 1/2012 | Hecht | 407/110 |
| 2006/0225553 A1 * | 10/2006 | Hasegawa et al. | 83/835 |
| 2009/0000454 A1 * | 1/2009 | Baernthaler et al. | 83/843 |
| 2010/0011933 A1 * | 1/2010 | Lucas | 83/835 |

FOREIGN PATENT DOCUMENTS

| | | | |
|---|---|---|---|
| DE | 42 36 370 A1 | 5/1994 | |
| DE | 4415425 | 11/1995 | |
| DE | 19955581 | 5/2000 | |
| EP | 0 385 495 | 9/1990 | |
| EP | 0385495 | 9/1990 | |
| EP | 542023 A1 * | 5/1993 | B23D 61/06 |
| EP | 896848 A2 * | 2/1999 | B23D 61/06 |
| EP | 1 995 008 B1 | 5/2008 | |
| JP | 2008036807 A * | 2/2008 | |
| WO | 96/16763 | 6/1996 | |
| WO | 99/12680 | 3/1999 | |

OTHER PUBLICATIONS

China Office Action conducted in counterpart Chinese Appln. No. 201110153726.5 (Mar. 14, 2013) (w/ English translation).

Search report from E.P.O. that issued with respect to patent family member European Patent Application No. 11167018.8, mail date is Sep. 16, 2011.

* cited by examiner

INSERT AND SAW BLADE WITH A PLURALITY OF INSERTS OF THIS TYPE

CROSS-REFERENCE TO RELATED APPLICATIONS

The present application claims priority under 35 U.S.C. §119 of Austrian Patent Application No. A 942/2010, filed on Jun. 9, 2010, the disclosure of which is expressly incorporated by reference herein in its entirety.

BACKGROUND OF THE INVENTION

1. Field of the Invention

The invention relates to an insert, in particular for a saw blade that is embodied or formed to be essentially flat and circular in a side view and has slots on a circumference, in which respectively one insert is held with an elastic clamping element, wherein the insert is embodied or formed in an elongated manner, has a cutting edge on the front and is optionally embodied or formed along a length of the insert, starting from the cutting edge, with a cutting face with an elevation and, directly or indirectly adjoining it, with a mounting surface for the clamping element.

Furthermore, the invention relates to a use of an insert of this type.

Furthermore, the invention relates to a saw blade that is embodied or formed to be essentially flat and circular in side view and has slots on a circumference, in which respectively one insert is held, wherein the saw blade is embodied or formed with elastic clamping elements, which hold respectively one insert in one of the slots.

2. Discussion of Background Information

It is known from the prior art to equip a circular saw blade on a circumference with a plurality of inserts, which ensure a cutting performance or chip removal during a rotation of the saw blade and placement against a workpiece. The inserts can thereby be fastened to the saw blade in different ways. It is possible for the inserts to be soldered to the saw blade, which, however, is associated with a high logistical expenditure for a length of use of the saw blade, since the inserts or the cutting edges thereof have to be resharpened in situ after wear. Alternatively, it is also possible for the individual inserts to be screwed on the saw blade. The inserts can then be easily removed once wear has occurred and replaced by new inserts. Logistical expenditure is thus reduced. However, it is a disadvantage that it is feasible for inserts only from a width of a saw blade of approx. 8 mm or more to be screwed on in situ by unskilled personnel. Another possibility is to attach or hold inserts in bit seats or slots of the saw blade by clamping elements shaped in a saw blade, which interact with control elements arranged in recesses of the saw blade. For this purpose, the saw blade can be embodied or formed with gaps, for example, so that integral clamping elements are formed between the gaps, which, for example, can be respectively moved by an eccentric cam located in an adjacent recess to an insert pushed in the bit seat or can be placed against it in order to fix the insert.

Saw blades that are equipped with integral clamping elements and control elements interacting therewith are known, for example, from DE 42 36 370 A1 or EP 1 995 008 A1, the disclosures of which are expressly incorporated by reference herein in their entireties. The corresponding inserts are embodied or formed such that an interaction with the corresponding clamping elements is possible. With these known inserts, however, despite the other advantages otherwise given, in interaction with a saw blade or the control elements thereof it has proven to be a disadvantage that, in particular with high stresses, the clamping forces that can be applied are too low so that individual inserts may be detached, which is not only undesirable, but can represent a danger to operating staff above all when the saw blade is rotating.

SUMMARY OF THE INVENTION

Embodiments of the invention are directed to an insert of the type mentioned at the outset that eliminate, or at least reduce, the above-noted disadvantages of the prior art and that can be effectively held via high clamping forces of a clamping element of a saw blade.

Another embodiment invention is directed to a manner of using the above-noted insert.

Furthermore, embodiments are directed to a saw blade of the type mentioned at the outset, with which the disadvantages of the prior art are eliminated or at least reduced.

According to the invention, with an insert of the type mentioned at the outset, the mounting surface is embodied or formed with a first partial surface, to which an upwardly projecting second partial surface adjoins and/or at the side of the first partial surface, starting from the cutting edge, along the length of the insert at least in some regions tapering lateral surfaces and/or lateral surface regions are provided.

One advantage achieved with the invention is to be seen in particular in that, in contrast to the prior art, an optimal distribution of clamping forces is possible due to the upwardly projecting second partial surface, which adjoins the first partial surface. While according to the prior art, e.g., DE 42 36 370 A1, first partial surfaces are provided, to which, adjoining a saddle point, a second partial surface sloping downwards adjoins, according to the invention a partial surface projecting upwards is provided. An optimal pressing of the insert into a bit seat or slot can be achieved thereby, because a resultant of the clamping force can be adjusted more favorably. Alternatively, it is also possible, starting from the cutting edge, along the length of the insert, for tapering lateral surfaces and/or lateral surface areas to be provided at least in some areas. An optimal adjustment of a resultant of the clamping forces can also be achieved in this case.

It is particularly preferred for the two variants presented above to be combined with one another, that is, a second partial surface projecting upwards adjoining the first partial surface is provided, and at the same time, starting from the cutting edge, along the length of the insert at least in some regions tapering lateral surfaces and/or lateral surface regions are provided. In this case not only is an optimal adjustment of clamping forces achieved, but at the same time also a self-centering of the insert in the saw blade upon the placement of the clamping element, since a lug of the clamping element presses on the second partial surface as well as the tapering lateral surfaces and/or lateral surface regions and at the same time on the first partial surface, and furthermore can bear against a region of the elevation sloping down to the first partial surface, so that upon the placement or pressing of the clamping element, the insert as it were centers itself in an exactly fitted manner in a saw blade plane.

It is also preferred that continuously tapering lateral surfaces are provided at the side of the first partial surface, starting from the cutting edge along the length of the insert, wherein a tapering extends over 75% of a length of the first partial surface, preferably essentially over the entire length of the first partial surface. Through a corresponding embodiment, the effects explained above can be further increased. However, it is not absolutely essential for the tapering lateral surfaces to be continuously tapering. It can namely also be provided for the lateral surfaces in plan view to be embodied or formed with a type of toothing, in which a corresponding toothing of the lug of a clamping element engages.

In contrast to the prior art, it can now be provided and it is preferred, for the first partial surface to be embodied or formed to be flat. The second partial surface can then be embodied or formed in plan view to be relatively short and to have, for example, no more than 10% of the length of the first partial surface, without the advantages of the invention being lost.

In principle, the second partial surface can already represent a terminating partial surface viewed along the length of the insert. However, it is preferred that at least one third partial surface adjoins the second partial surface, since the insert is preferably embodied or formed to be as long as possible in order to achieve a necessary stability of the same. If a third partial surface is provided, the third partial surface is preferably embodied or formed to be flat and ends at a downward sloping fourth partial surface, which adjoins the third partial surface and finally ends at a lateral surface. Neither the third partial surface nor the fourth partial surface is thereby in contact with the lug of the clamping element upon the pressing of a clamping element of a saw blade.

As is known from the prior art per se, the insert can be embodied or formed in the region of a base surface with a preferably V-shaped groove. On the one hand a centering of the insert in the radial direction and on the other hand a good fit of the insert in the bit seat or slot is achieved thereby.

Furthermore, it is advantageous if the insert is embodied or formed to be wider in the region of the cutting edge, so that the saw blade, to which several inserts are fastened, is released upon engagement in a workpiece.

The insert can be made per se of any materials, for example, a high-speed steel. However, it is preferred for the insert to be made of a hard metal and preferably to be coated. For example, a known titanium nitride or titanium carbon nitride coating can be used as a coating.

The further object is attained by the use of an insert according to the invention in a saw blade, which essentially is flat and is embodied or formed in a circular manner in a side view and has slots on a circumference, in which respectively one insert is held with an elastic clamping element.

The still further object of the invention is attained by a saw blade of the type mentioned at the outset, when the inserts thereof are embodied or formed according to an insert according to the invention.

One advantage thereby lies in the fact that the individual inserts can be held in the bit seats or slots with high clamping forces, so that they are not detached even when high acting forces are given. Furthermore, with respect to an introduction of the inserts a self-centering effect can also be given when the inserts have at the side of the first partial surface, starting from the cutting edge, along the length of the insert at least in some regions tapering side surfaces and/or side surface regions.

It is particularly preferred in order for the saw blade or the integrally embodied or formed clamping elements thereof to interact as well as possible with the individual inserts, that the clamping elements are respectively embodied or formed with a lug tapering conically towards a saw blade center in cross section to a saw blade plane.

Embodiments of the invention are directed to an insert formed in an elongated manner. The insert includes a cutting edge on a front side, a cutting face with an elevation formed along a length of the insert from the cutting edge, and a mounting surface structured and arranged for a clamping element one of directly or indirectly adjoining the cutting face. The mounting surface is formed with a first partial surface and at least one of an upwardly projecting second partial surface that adjoins the first partial surface and tapering lateral surfaces that are arranged at a side of the first partial surface and along a length of the insert starting from the cutting edge.

According to embodiments, the insert can be structured for insertion into a saw blade that, in a side view, is essentially flat and circular and has slots on a circumference. The insert is structured to be held in the saw blade by an elastic clamping element.

In accordance with embodiments of the invention, the tapering lateral surfaces can include continuously tapering lateral surfaces located at the side of the first partial surface, such that, starting from the cutting edge along the length of the insert, the tapering extends over 75% of a length of the first partial surface. Further, the tapering may extend over an entire length of the first partial surface.

According to another embodiment, the first partial surface may be formed as a flat surface.

In accordance with still other embodiments, in plan view, the second partial surface can be shorter than the first partial surface. Moreover, in plan view, a length of the second partial surface may be no more than 10% of a length of the first partial surface.

According to further embodiments, at least one third partial surface may be adjoining the second partial surface. Further, a downward sloping fourth partial surface can be adjoining the third partial surface. The third partial surface may be a flat surface and the fourth partial surface may end at a lateral surface.

According to further embodiments, the insert may further include a base surface, such that a V-shaped groove is formed in a region of the base surface.

In accordance with still other embodiments of the invention, in a region of the cutting edge, the insert may be widened.

According to embodiments, the insert can be made of a hard metal. Further, the insert may be coated.

According to still further embodiments, a recess may be formed in the cutting edge.

Embodiments of the invention are directed to a method of forming a saw blade, which is formed, in a side view, to be essentially flat and circular with slots on a circumference. The method includes inserting the above-noted insert into one of the slots, and elastically holding the insert with an elastic clamping element.

Embodiments of the instant invention are directed to a saw blade, which is formed, in a side view, to be essentially flat and circular. The saw blade includes at least one insert, as described above, at least one slot on a circumference structured and arranged to hold a respective on of the at least one insert, and at least one elastic clamping element structured and arranged to hold the respective one insert in the at least one slot.

In accordance with still yet other embodiments of the present invention, the clamping elements may include a lug tapering conically toward a saw blade center in cross section to a saw blade plane.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

FIGS. 1 through 5 show an insert 1 according to the invention in more detail. The insert 1 is embodied or formed in an elongated manner in plan view according to FIG. 1, namely approximately rectangular, and has a cover surface 2 as well as a base surface 3 lying opposite. The cover surface 2 and the base surface 3 are connected to one another by four side surfaces 4, 5, 6, 7. In the region of the side surface 5, a cutting edge 8 is embodied or formed on a line of intersection with the cover surface 2. The cutting edge 8 is essentially embodied or formed in a straight-line manner, but has a small recess or indentation 16, which as a result extends along the lateral surface 5. This recess or this indentation 16 is provided in order to divide a chip that is wide per se. As can be seen in particular from FIGS. 2 and 3, a region that slopes upwards with respect to the base surface 3 first adjoins the cutting edge 8, which region merges into a cutting face 9, which is preferably embodied or formed with a depression, that is, as a chip trough. An elevation 10 adjoins the cutting face 9, which elevation is used to guide away a removed chip. The elevation 10 has a highest point, from which the elevation 10 slopes downwards and finally merges into a mounting surface 11, in the region of which the insert 1 can be held in a bit seat by a clamping element.

As can likewise be seen from FIGS. 1 through 5, the mounting surface 11 is embodied or formed with a first partial surface 12, which adjoins the elevation 10. The first partial surface 12 is embodied or formed to be flat and runs parallel to the base surface 3 of the insert 1. As can be seen in particular from FIGS. 3 and 4, a relatively short second partial surface 13 adjoins the first partial surface 12, which second partial surface in side view as well as in plan view is only a fraction of a length of the first partial surface 12. It can preferably be provided that in plan view a length of the second partial surface 13 has less than 20%, preferably less than 10%, in particular less than 8% of the first partial surface 12. Although it is not mandatory, a flat third partial surface 14 can be provided on the second partial surface 13, which, starting from the first partial surface 12, is embodied or formed in an upwardly projecting manner, as well as a downward sloping fourth partial surface 15 adjoining the third partial surface.

Figure 1:
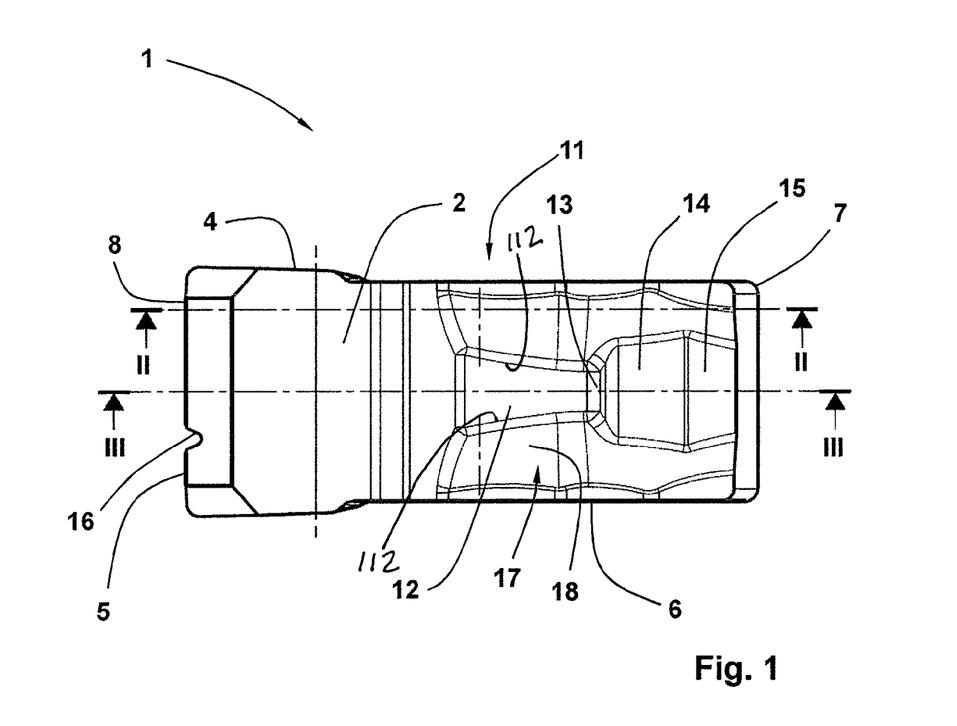
FIG. 1 illustrates an insert according to the invention.
Figure 2:
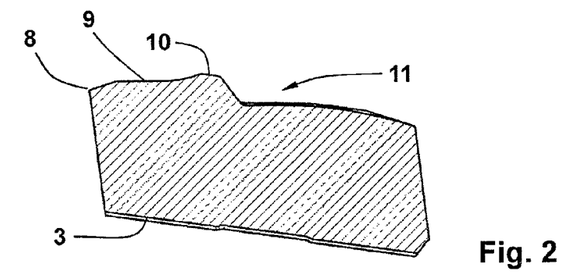
FIG. 2 illustrates a section along the line II-II in FIG. 1.
Figure 3:
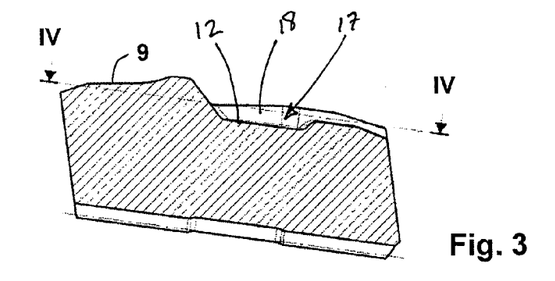
FIG. 3 illustrates a section along the line III-III in FIG. 1.
Figure 4:
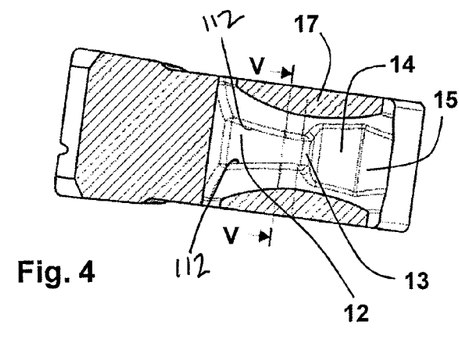
FIG. 4 illustrates a section along the line IV-IV in FIG. 3.
Figure 5:
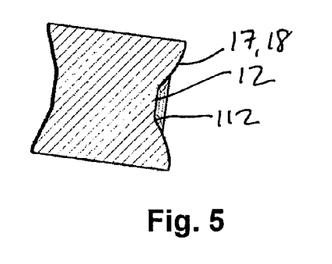
FIG. 5 illustrates a section along the line V-V in FIG. 4.

As can be seen from a review of FIGS. 1 through 4, at lateral sides 112 of the first partial surface 12, lateral surfaces 17 are embodied or formed toward the side surfaces 4, 6, which lateral surfaces 17, starting from the first partial surface 12, where they define lateral sides 112, are embodied or formed in an upwardly projecting manner like the second partial surface 13, but project beyond the second partial surface 13 in terms of height. The lateral surfaces 17 arranged on both sides of the first partial surface 12 are subdivided into several lateral surface regions. It is important that the lateral surfaces 17 or the individual lateral surface regions 18 are embodied or formed essentially in a tapering manner at least in the region of the first partial surface 12, seen starting from the cutting edge 8 along the insert 1 up to approximately in the region of the second partial surface 13, at least in some regions. Possible embodiment variants are not thereby necessarily limited to the embodiment variant shown in FIGS. 1 through 4. Instead, the embodiment of the lateral surfaces 17 or lateral surface regions 18 tapering at least in some regions can also be achieved in that an undulated or toothed structure is provided in the corresponding regions. In the region of the second partial surface 13 as well as the third partial surface 14 and the fourth partial surface 15, the lateral surfaces 17 or lateral surface regions 18 in turn can be embodied or formed diverging from one another in the same viewing direction, as can be seen in FIG. 4. It is achieved through an embodiment of this type, as can be seen in particular in FIG. 5, that a structurally stipulated depression with lateral stops is provided, which renders possible a particularly firm fixing of the insert 1 in a bit seat of a saw blade 19, which is explained below.

Figure 6:
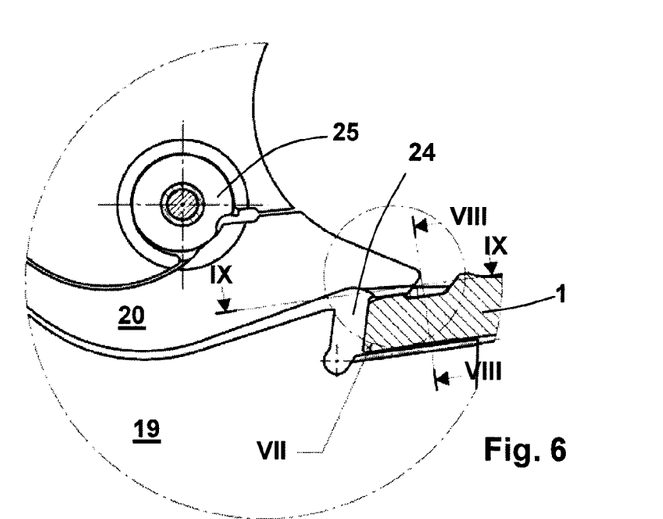
FIG. 6 illustrates a section of a saw blade with a clamping element in open position during the insertion of an insert.
Figure 7:
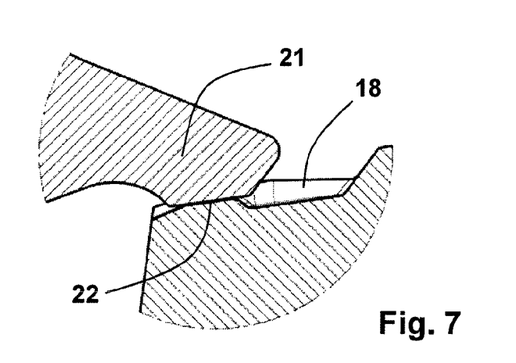
FIG. 7 illustrates an enlarged representation of the section VII in FIG. 6.
Figure 8:
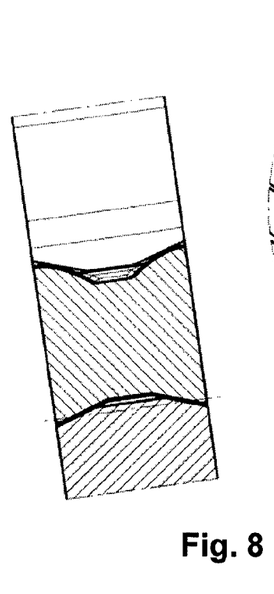
FIG. 8 illustrates an enlarged section along the line VIII-VIII in FIG. 6.
Figure 9:
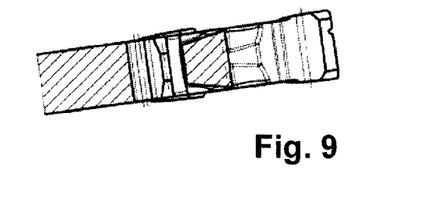
FIG. 9 illustrates a reduced section along the line IX-IX in FIG. 6.
Figure 10:
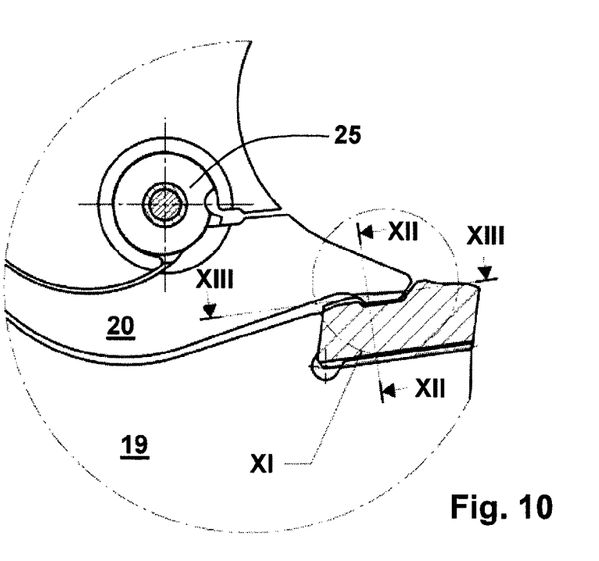
FIG. 10 illustrates a section of a saw blade with a clamping element in closed position and an attached insert.
Figure 11:
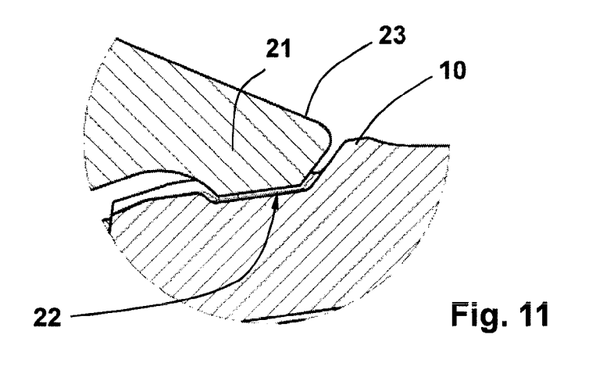
FIG. 11 illustrates an enlarged representation of a section XI-XI in FIG. 10.
Figure 12:
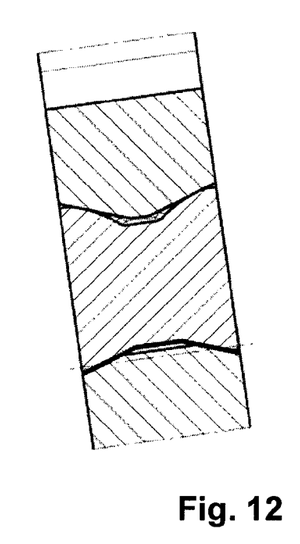
FIG. 12 illustrates an enlarged section along the line XII-XII in FIG. 10.
Figure 13:
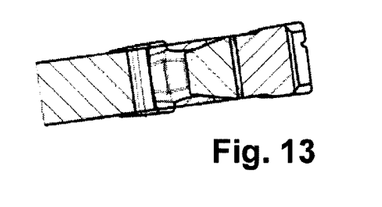
FIG. 13 illustrates a reduced section along the line XIII-XIII in FIG. 10.

FIGS. 6 through 9 show a part of a saw blade 19 with an elastically deformable clamping element 20 as well as cuts in this respect. The saw blade 19 is usually composed of a steel and is flat and embodied or formed in a circular manner in a full side view (not shown). The saw blade 19 has a plurality of bit seats or slots 24 distributed over a circumference, into which inserts 1 can be placed. In the region of the bit seats or slots 24, the saw blade 19 is embodied or formed respectively with an integrally shaped, elastically deformable clamping element 20, which has a lug 21 on the end. To make it possible to place the clamping element 20 on an insert 1, a cam 25 is provided, which is located in a recess of the saw blade 19 adjacent to the clamping element 20. As shown in FIG. 6, the cam 25 can be embodied or formed essentially in a circular manner and at two points in the recess bears against the saw blade 19 and at a further point against the clamping element 20, so that a 3-point arrangement is provided for the cam 25, which is advantageous and is known from EP 1 995 008 A1. By rotating the cam 25, the clamping element 20 can be placed against an insert 1 due to the slot-shaped gaps on an insert 1 shaped, for example, by a laser. To this end, the cam 25 is rotated counter clockwise by an auxiliary, for example, a spanner, in the recess, whereby the clamping element 20, which is embodied or formed in the region of a contact point with the cam 25 with a greater pitch compared to the circumferential surface thereof, is pushed downwards. Alternatively, it can also be provided for the clamping element 20 to be adapted to a circular form of the recess in which the cam 25 is located, wherein the cam 25 is embodied or formed eccentrically, however.

FIGS. 6 through 9 show a situation in which the clamping element 20 of the saw blade 19 is in an open position. In this position, the insert 1 can be easily pushed into the bit seat or the slot 24. A lug base surface 22 thereby slides over the second partial surface 13; subsequently, when the insert 1 has been completely pushed into the bit seat or slot 24, the lug base surface 22 of the clamping element 20 with the lug 21 on the end is located above a depression formed by the first partial surface 12 and the lateral surfaces 17 as well as the second partial surface 13 and the elevation 10.

Once the insert 1 has been pushed into the bit seat or the slot 24, the clamping element 20 can be placed against the insert 1 by actuating the cam 25 and fix it in the bit seat or slot 24, which is shown in FIGS. 10 through 13. Due to the depression, which is embodied or formed in a conical manner in plan view (FIG. 1 or 4), with placement of the clamping element 20, the insert 1 is automatically or easily centered in the bit seat or slot 24. In this respect it is also advantageous if the insert in the region of the base surface 3, as is known per se from the prior art, is embodied or formed with a V-shaped groove, in which a corresponding elevation of the saw blade 19 engages. This ensures that the insert 1 is automatically centered in a saw blade plane, when the clamping element 20 is placed against the pushed in insert 1 or is brought to rest against it by actuation of the cam 25. With actuation of the cam 25 and placement of the clamping element 20 against the first partial surface 12 for fixing and centering the insert 1, optionally, depending on the embodiment of the insert 1, a placement against the second partial surface 13 adjoining the first partial surface 12 can take place at the same time, which second partial surface, as mentioned, projects upwards with respect to the first partial surface 12, e.g., at an angle of 30° to 80° measured with respect to the base surface 3. However, this is not mandatory; then the second partial surface 13, which projects a maximum of 1 mm, serves primarily as an additional safeguard. In the situation shown in FIGS. 10 through 13, the clamping element 20 of the saw blade 19 merely presses onto the flat first partial surface 12 as well as the lateral surfaces 17, which is discernible in particular in FIG. 12. Since the lateral surfaces 17 as well as the lateral sides 112 of first partial surface 12 from which these lateral surfaces 17 upwardly extend, are embodied or formed in a tapering manner, a favorable distribution of forces can be achieved thereby, which has proven to be favorable in use in particular with high cutting forces. Although, as mentioned, it is not shown, alternatively or simultaneously it can also be provided for the lug 21 of the clamping element 20 to press onto the second partial surface 13 and thus an additional force component is given, which holds the insert 1 in the bit seat or the slot 24 in use or with acting cutting forces. In all cases a lug back 23 of the clamping element 20 forms with a front face of the elevation 10 an essentially continuous surface along which a chip can slide off.

Although the first partial surface 12 runs parallel to the base surface 3 in the exemplary embodiment explained above, the first partial surface 12 can also be slightly tilted, e.g., at an angle of up to approximately 5°, so that the lug base surface 23 in the clamped state of the clamping element 20 bears against the first partial surface 12 in a plane-parallel manner and in particular clamping forces are maximized.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An insert formed in an elongated manner comprising:
   a cutting edge on a front side;
   a cutting face with an elevation formed along a length of the insert from the cutting edge;
   a mounting surface structured for receiving a clamping element and arranged to one of directly or indirectly adjoin the cutting face; and
   the mounting surface comprising:
   a first partial surface extending between opposing lateral sides converging toward each other and forming a narrowed portion toward a distal free end opposite the cutting edge; a second partial surface adjoining and upwardly projecting from the narrowed portion of the first partial surface; and
   lateral surfaces extending upward from the first partial surface to define the opposing lateral sides of the first partial surface, whereby the lateral surfaces extending upward from the first partial surface are arranged to converge toward the end opposite the cutting edge.

2. The insert according to claim 1, wherein the insert is structured for insertion into a saw blade that, in a side view, is essentially flat and circular and has slots on a circumference,
   wherein the insert is structured to be held in the saw blade by an elastic clamping element.

3. The insert according to claim 1, wherein the lateral surfaces comprise continuously tapering lateral surfaces located at the lateral sides of the first partial surface, such that, starting from the cutting edge along the length of the insert, the tapering extends over 75% of a length of the first partial surface.

4. The insert according to claim 3, wherein the tapering extends over an entire length of the first partial surface.

5. The insert according to claim 1, wherein the first partial surface is formed as a flat surface.

6. The insert according to claim 1, wherein, in plan view, the second partial surface is shorter than the first partial surface.

7. The insert according to claim 6, wherein, in plan view, a length of the second partial surface is no more than 10% of a length of the first partial surface.

8. The insert according to claim 1, further comprising at least one third partial surface adjoining the second partial surface.

9. The insert according to claim 8, further comprising a downward sloping fourth partial surface adjoining the third partial surface,
   wherein the third partial surface is a flat surface and the fourth partial surface ends at a lateral surface.

10. The insert according to claim 1, further comprising a base surface, such that a V-shaped groove is formed in a region of the base surface.

11. The insert according to claim 1, wherein, in a region of the cutting edge, the insert is widened.

12. The insert according to claim 1, wherein the insert is made of a hard metal.

13. The insert according to claim 12, wherein the insert is coated.

14. The insert according to claim 1, further comprising a recess formed in the cutting edge.

15. A method of forming a saw blade, which is formed, in a side view, to be essentially flat and circular with slots on a circumference, comprising:
   inserting the insert of claim 1 into one of the slots; and
   elastically holding the insert with an elastic clamping element.

16. A saw blade, which is formed, in a side view, to be essentially flat and circular, comprising:
   at least one insert according to claim 1;
   at least one slot on a circumference structured and arranged to hold a respective on of the at least one insert;
   at least one elastic clamping element structured and arranged to hold the respective one insert in the at least one slot.

17. The saw blade according to claim 16, wherein the clamping elements comprise a lug tapering conically toward a saw blade center in cross section to a saw blade plane.

18. The insert according to claim 1, wherein the upwardly projecting second partial surface adjoins the first partial surface in a direction of the length of the insert.

19. The insert according to claim 1, wherein the lateral surfaces, which extend upward from the first partial surface and converge toward the end of the insert opposite the cutting edge, are angled toward a central longitudinal axis of the insert.

20. The insert according to claim 1, wherein each lateral surface extending upward from the first partial surface comprises tapering lateral regions that extend upward from the lateral sides of the first partial surface and toward the end of the insert opposite the cutting edge and the tapering lateral regions are angled toward a central longitudinal axis of the insert.

21. The insert according to claim 1, wherein the opposing lateral sides of the first partial surface are arranged in a converging manner in a direction away from the cutting edge and toward the second partial surface.

\* \* \* \* \*